Patented Apr. 25, 1933

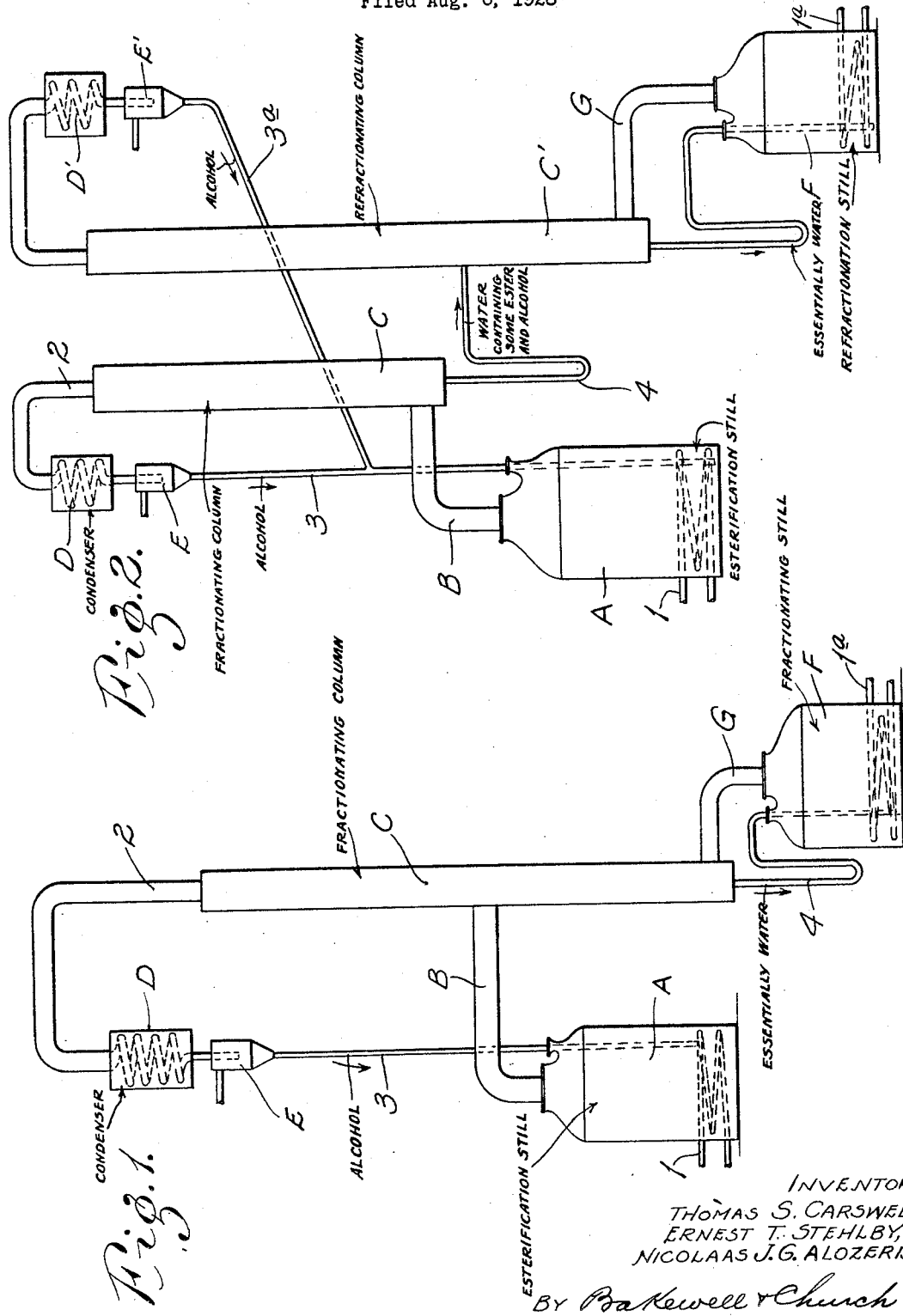

1,905,144

UNITED STATES PATENT OFFICE

THOMAS S. CARSWELL, ERNEST T. STEHLBY, AND NICOLAAS J. G. ALOZERIJ, OF ST. LOUIS, MISSOURI, ASSIGNORS TO MONSANTO CHEMICAL WORKS, OF ST. LOUIS, MISSOURI, A CORPORATION OF MISSOURI

METHOD FOR PRODUCING ESTERS

Application filed August 6, 1928. Serial No. 297,858.

This invention relates to the production of esters.

One object of the invention is to provide a method for producing esters from alcohols and acids, without the use of an inert solvent and without the use of a large quantity of a water absorbing substance.

Another object is to provide a simple and highly efficient method for producing methyl salicylate.

And still another object is to provide a practicable apparatus for practising our method.

It is well known that when an alcohol is esterfied by an acid, the reaction does not go quantitatively to completion, but stops when a certain equilibrium is reached, between the concentration of the alcohol and acid on one side, and the concentration of the ester and the water on the other side. Previous investigators have endeavored to make the reaction quantitative by removing the water as it was formed, either by the use of large amounts of substances which have an affinity for water, such as sulphuric acid or zinc chloride, or by distilling the reaction mixture with an inert and water-immiscible solvent, which carries over the water from the reaction mixture.

We have devised a method by which alcohols can be esterified with acids without the use of an inert solvent, and without the use of a large quantity of a water-absorbing substance. Our method is limited to alcohols that boil below 100° C., and acids that are practically non-volatile below 120° C. Our method, briefly described, consists in mixing an excess of alcohol with an acid which is to be esterified, heating said mixture to boiling, using the mixture of vapors evolved in this operation to continuously remove from the boiling mixture the water formed in the reaction, and introducing alcohol into the boiling mixture so as to shift the equilibrium between the components in such a way as to favor practically the complete formation of ester. Preferably, the additional alcohol that is introduced into the boiling mixture is obtained by subjecting the vapors escaping from said boiling mixture to such treatment as to effect the separation and recovery of the alcohol from the water, and thereafter returning the recovered alcohol to the original boiling mixture. We also prefer to subject the separated water to such treatment as to recover any alcohol contained in the same, and thereafter return the alcohol recovered from said water back to the original boiling mixture. Our method may be practised in various types and kinds of apparatus, and when it is necessary to increase the velocity of the reaction, a small amount of a suitable catalyst, such as sulphuric acid, may be added to the original mixture. The apparatus that we prefer to use comprises a closed boiling chamber, wherein the original mixture is heated to boiling, and a vapor outlet leading from said boiling chamber to a fractionating column which is so regulated that pure alcohol is discharged from the condenser associated with said fractionating column and returned to the boiling mixture in said boiling chamber. The waste which runs from the lower end of the fractionating column is subsequently treated in such a manner as to recover any alcohol contained in the same. This is usually effected by conducting said waste into a second closed boiling chamber, wherein water is being boiled. The vapors evolved in this second boiling chamber may either be passed back into the fractionating column referred to, wherein said vapors are completely stripped of alcohol, or said vapors may be introduced into a separate and distinct fractionating column, wherein they are completely stripped of alcohol. In either case the alcohol recovered from the vapors evolved in this second boiling operation is returned to the original boiling mixture. The water which is formed in the reaction finally collects in the second boiling chamber, from which it may be drawn off when the reaction is complete.

Figures 1 and 2 of the drawing are diagrammatic views, illustrating two different kinds of apparatus that may be used in practising our method.

The apparatus illustrated in Figure 1 comprises a closed boiling chamber A that is adapted to receive a mixture of alcohol and acid. If desired, a suitable catalyst can be mixed with the alcohol and acid in the boiling chamber A. The mixture in the chamber A is heated until ebullition occurs, by means of a coil 1 or other suitable means. The mixture of vapors evolved in this operation escapes from the upper end of the chamber A through a vapor outlet B, into a fractionating column C, which may be of any conventional type, such as a fractionating column equipped with bubbling plates or screens or a fractionating column packed with rings. As is customary, the fractionating column C is provided with a dephlegmator or split flow device, so as to obtain good fractionation. In view of the fact that the fractionating column C may be of any preferred or suitable construction, we have not illustrated the details of construction of the same, but have simply shown a vapor pipe 2 leading from the upper end of said column to a condenser D. The mixture of vapors that escape from the boiling chamber A into the fractionating column are separated in said column into water which passes downwardly through the column, and alcoholic vapors which pass upwardly through the column into the condenser D. The distillate produced by the condensation of the vapors supplied to the condenser D, passes into a vented funnel E which is connected by means of a return pipe 3 with the boiling chamber A that contains the original boiling solution, and the reflux from the fractionating operation, consisting of the water separated from the mixture of vapors, passes down the entire length of the fractionating column, and escapes from the lower end of same through a reflux outlet pipe 4 that leads to a second closed boiling chamber F, wherein water is being boiled. As shown in the drawing, a coil or other suitable means 1ª is used to heat the boiling chamber F. The vapors evolved in the boiling chamber F escape from the upper end of said chamber through a vapor outlet pipe G into the lower end of the fractionating column C, and in traveling upwardly through said column, effectively remove the last traces of alcohol from the reflux or water coming down said column.

In Figure 2 we have illustrated another form of apparatus that may be used for practising our method, that is similar in general design and in principle of operation to the apparatus shown in Figure 1, except that the reflux outlet pipe 4 at the lower end of the fractionating column C leads to a second fractionating column C′, to the lower end of which vapors are supplied from the second boiling chamber F through an outlet pipe G which leads from the upper end of said chamber F. The alcohol vapors that escape from the upper end of the second fractionating column C′ enter a condenser D′, and the resultant distillate is discharged into a funnel E′ that is provided with an alcohol return pipe 3ª which either leads back directly to the first boiling chamber, or to the alcohol return pipe 3 that leads to said chamber from the funnel E.

In using our method in the preparation of methyl salicylate either the apparatus shown in Figure 1 or the apparatus shown in Figure 2 may be employed. Assuming that the apparatus shown in Figure 1 is used, the procedure is as follows:

A mixture consisting of approximately 900 grams of salicylic acid, 437 grams of methanol and 50 grams of a catalyst, such as sulphuric acid, is introduced into the chamber A. This mixture is heated to boiling. The reflux in the fractionating column C is adjusted so that practically pure methanol is returned to the chamber A through the return pipe 3. At the same time approximately 200 grams of water are placed in the second boiling chamber F and brought to boiling, and the boiling is regulated so that sufficient heat is supplied to give the necessary reflux in the column C. The apparatus is operated in this manner for approximately twenty hours. At the end of this time the ester is isolated from the reaction mixture by any suitable procedure, such as combining and fractionating the contents of the chambers A and F, so as to remove the excess of alcohol. The aqueous layer is separated and the oil layer is washed with dilute sodium carbonate solution. The ester is then distilled in vacuum when a yield of about 939 grams of methyl salicylate or about 94% of the theory is obtained.

Having thus described our invention, what we claim as new and desire to secure by Letters Patent is:

1. The method which comprises boiling a mixture of an aliphatic alcohol, whose boiling point is below 100° C. and which is soluble in water in all proportions, and a monocarboxylic acid of the benzene series that is substantially non-volatile below 120° C. while avoiding a substantial excess of either of the ingredients, continuously fractionating the vapors, which consist of water and alcohol, to separate the water present therein and returning the alcohol to the boiling mixture.

2. The method which comprises boiling a mixture of an aliphatic alcohol, whose boiling point is below 100° C. and which is soluble in water in all proportions, and a hydroxy carboxylic acid of the benzene series, while avoiding a substantial excess of either of the ingredients, continuously fractionating the distillate, which consists of water and alcohol, to separate the water present therein and returning the alcohol to the boiling mixture.

3. The method which comprises boiling a mixture of an aliphatic alcohol, whose boiling point is below 100° C. and which is soluble in water in all proportions, and a salicylic acid while avoiding a substantial excess of either of the ingredients, continuously fractionating the vapors, which consist of water and alcohol, to separate the water present therein and returning the alcohol to the boiling mixture.

THOMAS S. CARSWELL.
ERNEST T. STEHLBY.
NICOLAAS J. G. ALOZERIJ.